(12) United States Patent
Ristolainen et al.

(10) Patent No.: US 10,083,632 B2
(45) Date of Patent: Sep. 25, 2018

(54) PATIENT SPECIFIC ANATOMIC KIDNEY PHATNOM

(71) Applicant: Tallinn University of Technology, Tallinn (EE)

(72) Inventors: Asko Ristolainen, Tallinn (EE); Peeter Ross, Tallinn (EE)

(73) Assignee: Tallin University of Technology, Tallinn (EE)

( * ) Notice: Subject to any disclaimer, the term of this patent is extended or adjusted under 35 U.S.C. 154(b) by 406 days.

(21) Appl. No.: 14/785,738

(22) PCT Filed: Mar. 7, 2014

(86) PCT No.: PCT/EP2014/054448
§ 371 (c)(1),
(2) Date: Oct. 20, 2015

(87) PCT Pub. No.: WO2014/173579
PCT Pub. Date: Oct. 30, 2014

(65) Prior Publication Data
US 2016/0148541 A1    May 26, 2016

(30) Foreign Application Priority Data
Apr. 24, 2013  (EP) .................................... 13165254

(51) Int. Cl.
*G09B 23/30* (2006.01)
*G09B 23/28* (2006.01)
*G09B 5/02* (2006.01)

(52) U.S. Cl.
CPC ............ *G09B 23/303* (2013.01); *G09B 5/02* (2013.01); *G09B 23/285* (2013.01); *G09B 23/30* (2013.01)

(58) Field of Classification Search
None
See application file for complete search history.

(56) References Cited

U.S. PATENT DOCUMENTS 2,324,702 A * 7/1943 Hoffmann .............. G09B 23/32
                                                    264/222
5,055,051 A * 10/1991 Duncan .................. G09B 23/28
                                                    434/262

(Continued)

FOREIGN PATENT DOCUMENTS

GB          2328775          3/1999

OTHER PUBLICATIONS

Hunt A. et al. Low cost anatomically realistic renal biopsy phantoms for interventional radiology trainees. 2013. Eur. J. radial. 82:594-600.

(Continued)

*Primary Examiner* — James Hull
(74) *Attorney, Agent, or Firm* — Berggren LLP

(57) ABSTRACT

The invention relates to an antonnical kidney phantom with calyces for drainage training in interventional radiology. The antonnical kidney phantom simulator comprises a housing filled with the surrounding material and an anatomical kidney phantom placed into surrounding material. The kidney phantom has a number of cavities simulating parts of the kidney for drainage training in interventional radiology for example the cavities are simulating kidney calyces. The cavities are connected by channels and connecting pipe with outer reservoirs filled with the different colors or the x-ray opaque contrast liquids.

11 Claims, 4 Drawing Sheets

(56) References Cited

U.S. PATENT DOCUMENTS

| | | | |
|---|---|---|---|
| 6,474,993 B1 * | 11/2002 | Grund | A61L 27/20 434/262 |
| 2008/0065006 A1 * | 3/2008 | Roger | A61M 1/16 604/65 |

OTHER PUBLICATIONS

King D.M et al. 2011. Development of a vessel mimicking matarial for use in anatomically realistic doppler flow phantoms. Ultrasound in Med & Biol. 37 (5): 813-826.

King D M et al 2010 . Development of a range of antaomically ralistic reanl artery flow phantoms. Ultrasound in Med & Biol 36 (7) 1135-1144.

Rock BJ et al. 2010. A training simulator for ultrasound guided percutanous nephrostomy insertion. The British J. of Radiology 83: 612-614.

Opik R et al. 2012. Development of high fidelity liver and kidney phantom organs for use with realistic sugical systems. The 4th ICCC RAS/EMFS Intl Conf of Beimedical robotic and Biomechanotronics. Jun. 24-27, 2012.

Strohman and Giese 2005. Ex vivo trainign model for percutaneous renal surgery. Urol res 33: 193-199.

International search report fof PCT/EP2014/054448 dated Jun. 24, 2014.

\* cited by examiner

PATIENT SPECIFIC ANATOMIC KIDNEY PHATNOM

This application is a national application of PCT-application PCT/EP2014/054448, filed on Mar. 7, 2014, which claims priority of the European application number EP13165254.7 filed on Apr. 24,2013, both of which are incorporated herein by reference.

TECHNICAL FIELD

The present invention relates to medical anatomical simulator of patient organs, and more particularly the invention relates to a patient specific anatomical kidney phantom with calyxes for drainage training in interventional radiology for example before patient surgery.

BACKGROUND ART

Interventional radiology has been a rapidly developing area in minimally invasive (MI) procedures due to late advances in the medical imaging [1] and rapid progress in the development of procedure equipment. MI procedures have advantages such as improved patient safety and reduced discomfort, reduced hospital stay, reduced operating room cost, etc. [2-4]. The vast amount of skills that radiology residents or other specialty residents dealing with MI procedures must learn in training period makes anatomical phantoms a desired test platform on what the residents can get their first hands-on experience before everyday practice. The anatomical phantoms are not only useful for skill development in needle guidance and US probe handling for residents but also for practicing radiologist to improve their skills with new techniques and ever changing equipment and also to rise their confidence before procedures on patients. Confidence could be raised also with patient specific organ training, which is widely used in form of surgical simulators [5], but has not yet been extensively used in physical phantoms due to high cost and limited usage of the commercial phantoms.

In previous work the authors of the present invention are developed an anatomically shaped kidney phantom for interventional radiology trainees [6] with the possibility to practice variable needle thickness biopsies using US guidance. The previous version of the kidney phantom did not have drainage functionality. In order to resolve this shortcoming and to widen the spectra of the procedures of our patient specific phantoms, we decided to add drainage functionality of cysts to our kidney phantoms with the possibility also to rehearse nephrostomy drainage.

In the literature few phantoms are found that were developed for nephrostomy. Recently Rock et al [7] produced a cheap gelatine-based phantom for ultrasound-guided percutaneous nephrostomy insertion. Strohmaier and Giese [8] used porcine kidneys casted into silicone to create training phantom for all percutaneous endourological procedures (e.g. percutaneous nephrostomy, percutaneous lithotomy, endopyelotomy). The market provides few phantoms that could be used for nephrostomy training which are usually with high price and limited usage possibilities. A short list of phantoms on the market is shown in following table (probably not exhaustive):

TABLE 1

Nephrostomy phantoms on the market

| Producer | Phantom model description | Price |
| --- | --- | --- |
| Limbs and Things | Ultrasound Percutaneous Nephrostomy Trainer | £494.00 [9] |
| Mediskills Limited | Perc Trainer - Kidney model for percutaneous access training | around £2,500$_a$ |
| Simbionix | PERC Mentor ™ - medical simulator for training percutaneous access procedures performed under real-time fluoroscopy | |

In addition from the document GB2 328 775, 3 Mar. 1999, Sami Ahmed Moussa is known a simulator for medical training comprising a replica body organs and surrounding soft tissue made of materials which have similar radiographic densities and acoustic properties to the real subjects, thus providing suitable responses to x-rays and ultrasound. However there is lack of possibilities to simulate different part of the organ, for example the human kidney contains number of calyxes, and it is very important to train the biopsy and/or drainage with all parts of the kidney involved. The opportunity to train on the kidney phantoms which have different anatomic structures gives the trainee more realistic environment and helps to avoid situations that could be harmful for the patient in real life procedures.

Document US 2003/091967, Chosack Edna, 15 May 2003 discloses a system for simulating the minimally invasive medical procedure of urological endoscopy. The system provides a simulated medical instrument and tactile and visual feedback of the simulated procedure including a mannequin with simulated ureteral opening into which the simulated endoscope inserted. Said method includes in addition the effect of dynamic contrast injection of due into the urinary tract for fluoroscopy which is used for visualisation of the endoscope in the urological organ system.

Form the document U.S. Pat. No. 5,055,51, 8 Oct. 1991, Dornier Medical Systems, Inc. is known an apparatus and method for training physicians and technicians to locate stones found in simulated human body organs, principally simulated biliary and renal calculi, and then actually fragment these calculi using ESWL. A reusable semi-anthropomorphic phantom comprises an opaque liver tissue-equivalent mass having anatomically correct simulated organ cavities associated with the midsection of a human body, principally the gall bladder and the kidney. Channels lead from the exterior of the phantom to the simulated organs. Concrements are introduced into at least one simulated organ, the channels and simulated organs are filled with a fluid-like substance, and the channels are closed with plugs. The channels are connected and there are no possibilities for biopsy of the different parts of the organ by indication that the biopsy is done to right part of the organ for example kidney. As the kidney consist more than one objects of interest after the procedures and drainage of the organs it is impossible to evaluate if the procedure was successful in a specific part of the organ.

DISCLOSURE OF INVENTION

In the present invention the authors will describe the new class of patient specific phantoms and their preparation. In addition they describe the evaluation process of the phantoms and the design of radiology residents training using the phantoms according to present invention.

Compared to the phantoms found on the market the authors have produced an affordable disposable drainage practice phantom with the possibility to practice nephrostomy which widens the kidney phantoms utility possibilities. In addition the price per phantom makes the solution according to the present invention a possible contestant on the market of renal biopsy phantoms. In general the authors of present invention believe that the patient specific phantom will be accepted by the radiology staff to use phantoms of present invention in training and in everyday practice before the surgery.

The advantages of the present patient specific anatomical kidney phantom with calyxes for drainage training in interventional radiology are obtained by manufacture anthropomorphically accurate 3D phantom organs having physiologically realistic mechanical and imaging properties. In the first step the accurate 3D shape of the organ for example of the patient kidney is created, thereafter the kidney mold was manufactured and filled with the gelatine mixture that had appropriate ultrasound properties. In another embodiment the realistic 3D shape was produced by using human abdominal CT scan which allows to manufacture very realistic organ phantom with all parts of the organ. Before casting the kidney phantom the kidney calyxes and drainage system comprising connecting pipes and reservoirs are placed in housing of the phantom according to the placement of calyxes in the patient kidney. Each reservoir has connection via connecting pipes to different parts (calyxes) of the kidney but they are not connected to each other which allow filling reservoirs during the biopsy studies with liquids of different colours and also with x-ray contrast media for training under fluoroscopy or CT guidance.

BRIEF DESCRIPTION OF DRAWINGS

The embodiment of the anatomical kidney phantom in accordance with the present invention will be described below in detail with references to the accompanying drawings, in which.

BEST MODE FOR CARRYING OUT THE INVENTION

Figure 1:
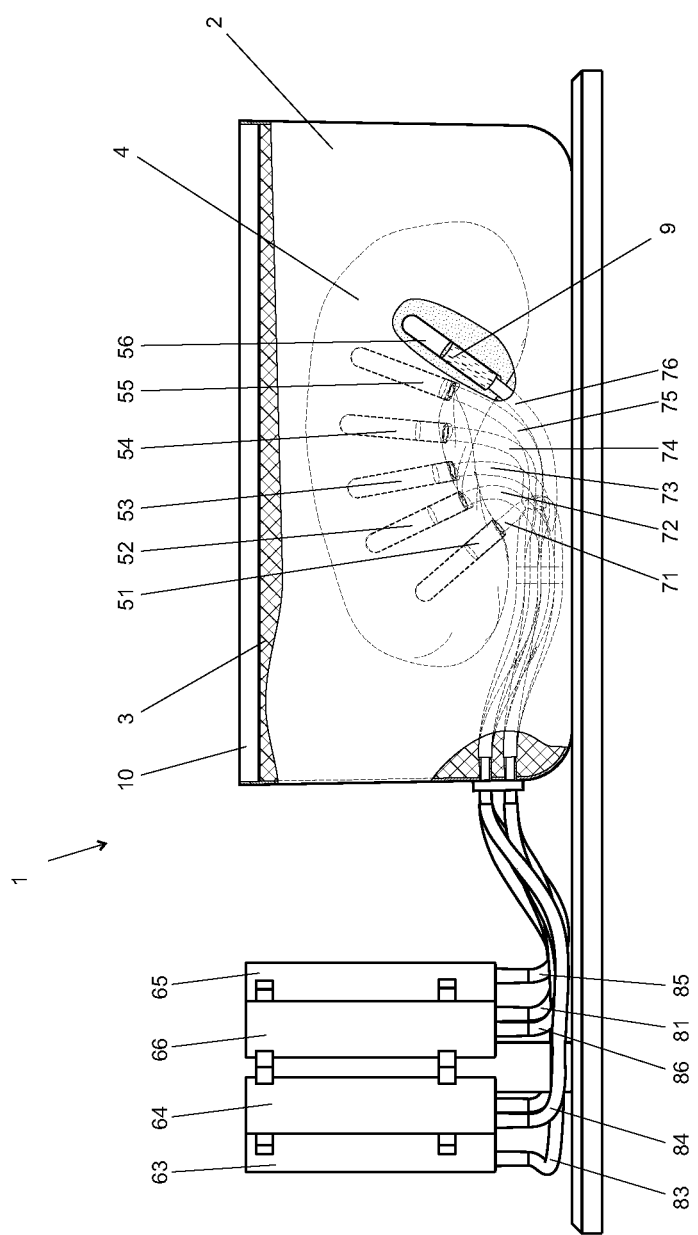
FIG. 1 is a side view of the anatomical kidney phantom simulator with cut-outs showing kidney parts.
Figure 2:
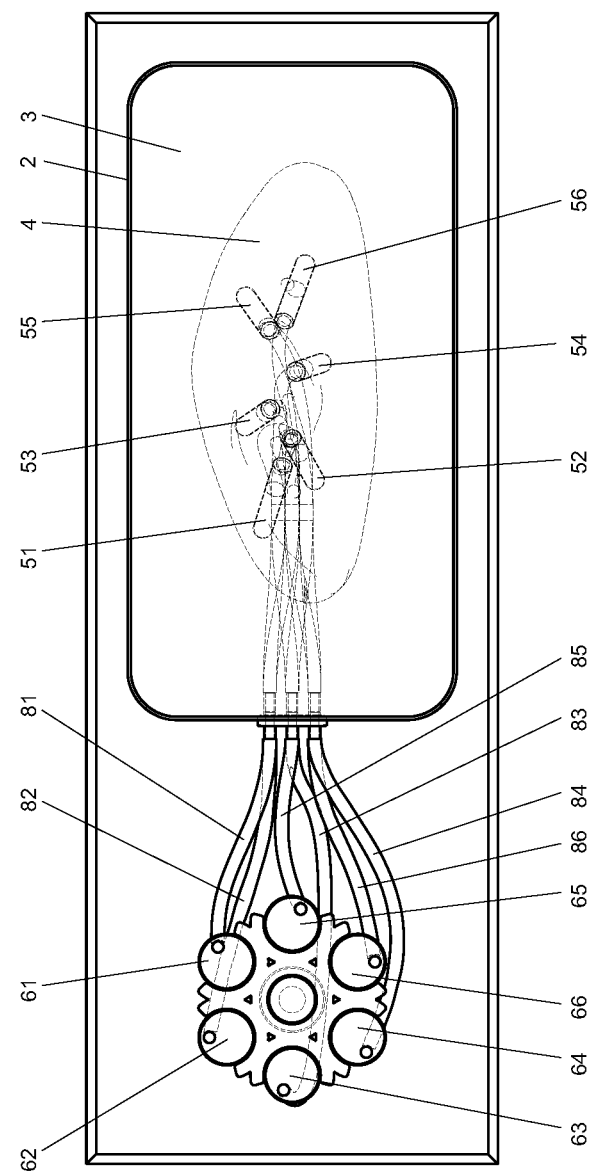
FIG. 2 is a upper view of the anatomical kidney phantom simulator showing outer reservoirs and connecting pipes.

The anatomical kidney phantom simulator 1 comprises a housing 2 fixed to the base 11 and filled with the surrounding material 3 which replicates soft tissue of a patient. The housing is covered with a covering material 10 having properties corresponding to the patient skin. Into surrounding material is placed an anatomical kidney phantom 4 where said kidney phantom has a number of cavities 51, 52, 53, 54, 55, 56 simulating a parts of the kidney for drainage training in interventional radiology for example the cavities are simulating kidney calyxes. The cavities are placed in the manner which corresponds to the real placement of the kidney calyxes in the real patient kidney. Outside of the housing are outer reservoirs 61, 62, 63, 64, 65, 66 for liquids used for determining correct insertion of the catheter or for visualisation calyxes in fluoroscopy. The reservoirs can be fixed to the base 11 with connecting means or in alternative embodiment directly to the housing. As for simulating the different calyxes the liquids 9 are in different colours or the x-ray opaque contrast liquids are used. The number of outer reservoirs corresponds to the number of the cavities 51, 52, 53, 54, 55, 56 in the anatomical kidney phantom. Surrounding material comprises the channels 71, 72, 73, 74, 75, 76 for connecting the cavities 51, 52, 53, 54, 55, 56 with the outer reservoirs 61, 62, 63, 64, 65, 66 for introducing different colours or x-ray opaque contrast liquids 9 from outer reservoirs into the cavities. In one embodiments the reservoirs cab be placed or connected to the housing, However in the preferred embodiments to the reservoirs are connected the connecting pipes 81, 82, 83, 84, 85, 86 and said pipes are connected to the channels 71, 72, 73, 74, 75, 76. Each outer reservoir is connected by corresponding pipe and channel only to one cavity simulating kidney part for example calyx and the cavities are not connected to each other which allows to manufacture anatomical kidney phantom simulator corresponding to real patient kidney so that the surgery can be performed without the involving a patient in advance to discover and identify the precise punctuation locations.

The cavities 51, 52, 53, 54, 55, 56 simulating the kidney calyxes are formed from air balloons with diameter 5 to 7 mm and placed into the mold before casting the kidney and removed after kidney casting. In preferred embodiment the channels 71, 72, 73, 74, 75, 76 are made from silicone pipes like the connecting pipes are made from silicone.

An anatomically correct kidney phantom was created based on series of computed tomography (CT) images. The model of the kidney was created by segmenting the CT images and creating a STL model in 3D Slicer software. Using the kidney model a two sided mold was modelled by using computer aided design software. The mold was made of PLA plastic (Poly Lactic Acid) using rapid prototyping technique (3D Touch 3D printer from BitsfromBytes). Prior casting the kidney phantom, 3 reservoirs that represented kidney calyxes with a diameter of 20 . . . 23 mm were prepared from air balloons and placed into the mold. The calyxes were connected (with silicone pipes, inner diameter 3 mm) with outer reservoirs (made out of 12 ml syringes) after preparing the kidney phantom and before casting the gelatine medium around the phantom organ in a box (20× 10×10 cm). Before casting the surrounding medium, air balloons were removed from the kidneys. The top surface of the phantom was covered with pigmented silicone layer (EcoFlex 0030) simulating the patient skin. The kidney was casted into surrounding gelatine medium without kidney capsule. The three calyxes were filled with differently coloured water through the reservoirs. Different colours were used to assure that the correct calyx was punctured when the kidney is used for studying biopsy of the kidney.

The volumetric data of the patient allows to reconstruct also blood vessels (not shown in the drawings). The blood vessels tree could be printed in 3D printer with chemically soluble material. After the printing the blood vessels tree, a smooth layer of silicone (for example Dragon Skin, Smooth-On) can be painted on top of the tree. Later the printed tree can be removed under the silicone layer by etching the material chemically leaving us a blood anatomically shaped blood vessels that can be later filled with blood mimicking fluid through channels connected to the kidney phantom and connected to the outside reservoirs.

In their previous work [6] the authors well described different phantom materials and chose to use gelatine gels as the tissue-mimicking material as they are self-supportive solids with a proper range of achievable elasticity, US characteristics and a relatively simple manufacturing process. A thorough characterization of the material was performed.

The short description of preparing gelatine mixture for casting phantoms is as follows:
- gelatine powder and graphite flakes are added to water and allowed to hydrate for 10 minutes (weighed using KERN PCB250-3 and PCB10000-1);
- the hydrated mixture was placed into hot bath and constantly stirred to increase the temperature of the mixture to 32 . . . 40° C.;
- the warmed mixture was placed to vacuum chamber for 10 minutes (approx. 10 kPa) to degas solution. The solution cleared and bubbles surfaced;
- formaldehyde (37 wt. % solution) was added while slowly stirring the solution;

The mixture was poured into mold and the mold was rotated until the solution congealed to prevent the graphite from settling and placed in refrigerator for further hardening and storage (5° C.).

In order to validate the reconstruction quality of the patient-specific kidney phantoms the post mortem scans of the patient kidneys (by using DAVID-Laserscanner software with a Logitech C920 webcam and a projector) were conducted in cooperation with the hospitals pathologist and compared the results with reconstructed models from CT data.

Inclusion criteria were set for the patients. The time between the autopsy and recording of the CT scan had to be 14 days or less. Only kidneys without acute pathology, without solid tumours and cysts less than 3 cm were included.

The computer models of kidneys were built using the following procedure:
- The patient kidney was removed from the abdomen and excess fat around the kidney was removed;
- Ureter, renal vein and artery were cut of close to renal pelvis;
- Each kidney was hung with a rotating hook to portable frame and scans from scanned 12 times from different angles taken to maximize covered surface;
- At a later stage obtained scans were merged together into a single mesh semi-automatically for further comparisons. The mesh defined the surface of the patient specific kidney model.

Shape and surface area of the kidney vary in CT scan and physical scans due to the deformation of the organ in the portable frame so only volume of the kidney models were compared in 3D software.

The average difference in volume between post mortem kidney scans and reconstruction from CT data of 10 kidneys was below 5%.

In addition to drainage the authors carried out tests to evaluate radio-frequency ablation (RFA) on the previous version of the kidney phantom. The tests showed that the phantom consistency is usable also for RFA needle guidance training with the US machine and is mimicking the real tissue properties in low temperature heating of the lesions in the phantom.

The phantom was also successfully used by radiologists to train the insertion of percutaneous nephrostomy catheter under the fluoroscopy drainage. The calyxes were filled with radioopaque x-ray contrast media through the connecting tubes to make calyxes visible in fluoroscopy. The similar method is used in real life to visualize calyxes where the ureter is catheterized and x-ray contrast is injected using retrogradely to the calyxes.

Figure 3:
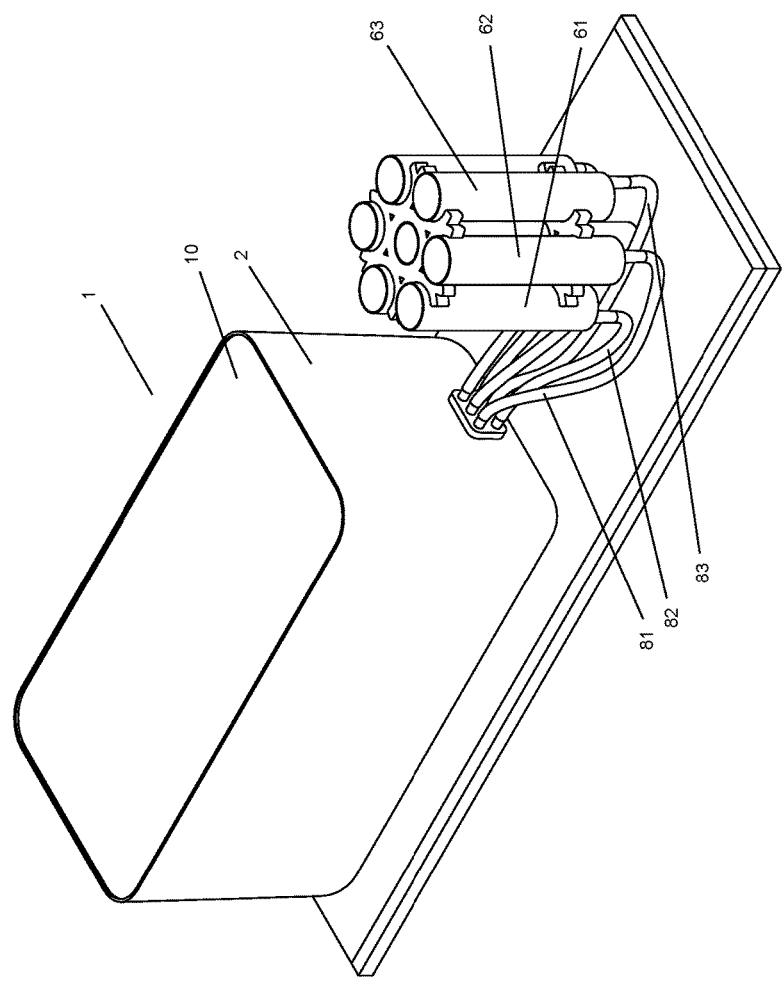
FIG. 3 is a perspective view from above of the anatomical kidney phantom simulator.
Figure 4:
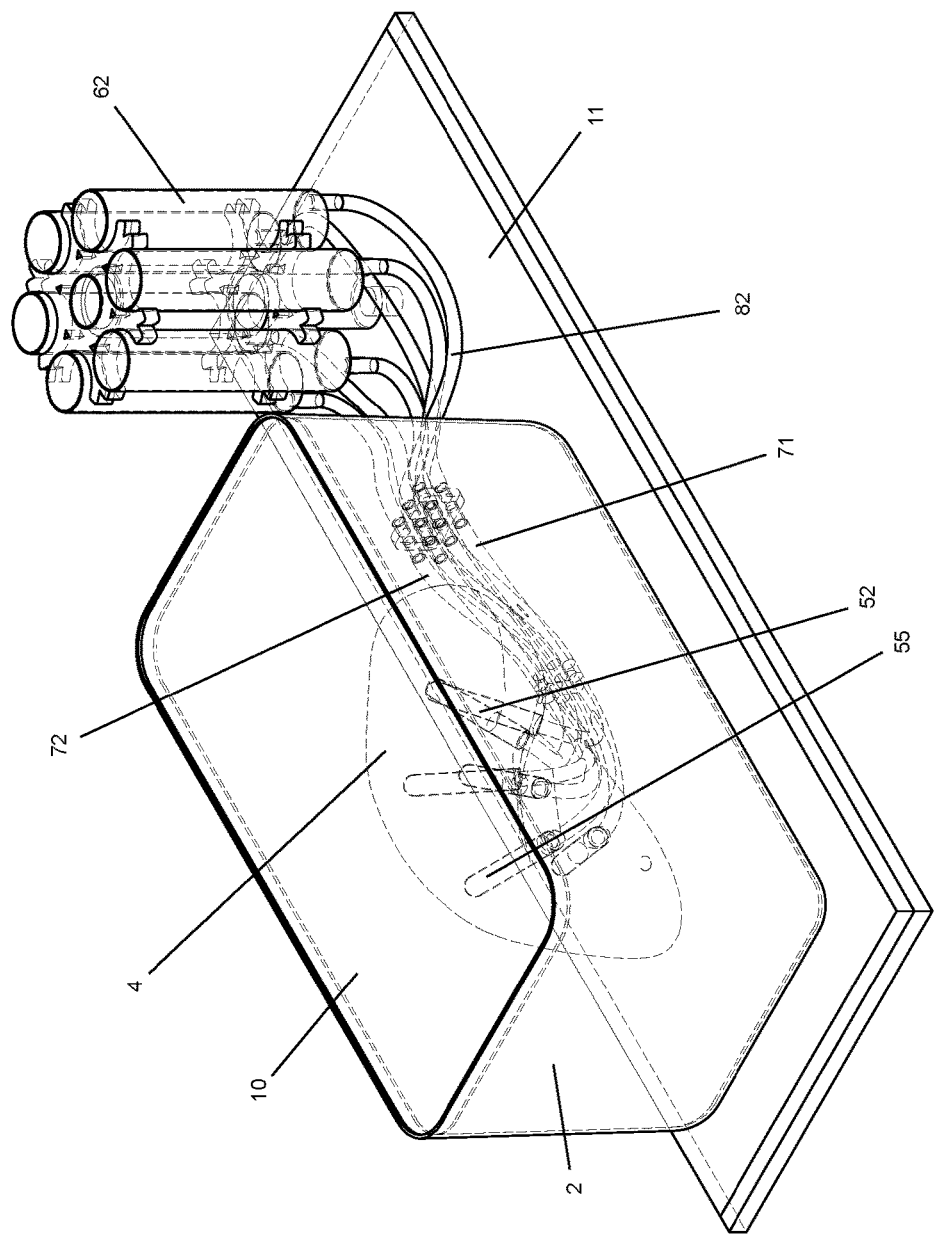
FIG. 4 is a schematic perspective view showing design of the anatomical kidney phantom simulator.

A patient specific kidney phantom with six calyxes was prepared for commercialization purposes. The walls of the calyxes were made out of narrow air balloons and placed into the kidney mold prior casting. The connecting tubes to the calyxes were orientated and bound together in a way, that they represent the descending ureter. The reservoirs made out of syringes were placed away from the phantom (see FIG. 3).

As of the training analysis, video recordings proved to be a very useful tool not just for time measuring but also for post training analysis of correct methods and posture of handling syringe and US probe.

The puncture procedure of the patient specific kidney phantom will be done by using freehand US guidance method with following steps of the procedure:
- Adding US gel to the surface of the phantom and examining the phantom with linear probe;
- Choosing the target point, deciding on the depth of the procedure and choosing the needle;
- Keeping the US probe in place, puncturing the skin with the needle from the correct side and in the same plane of the US probe;
- Inserting the needle into the target while keeping the target and the needle visible in the US image;
- Extracting liquid from the target.

Alternatively to the free hand technique, biopsy guiding systems embedded to the US probe could be used to perform this training. Guiding system fix the needle to the probe in a way that the needle follows ultrasound image plane and does not allow adjusting the course of the needle after the insertion through the skin. This method would allow the residents to perform the puncture procedure with better results but it would leave them without practical skills of hand-eye coordination that is necessary in freehand technique.

In additional embodiment the electrical contacts (not shown in the drawings) are submerged into outer reservoirs and connected to a punctuation needle used for punctuation of the anatomical kidney phantom. The electrical conductivity of the liquids added to the reservoirs is used for instant identification of a needle entering into cavity for controlling the work precision of interventional radiologists or residents. When the needle enters into the correct cavity the electrical circuit between the needle and electrical contact closes due to the electrical conductivity of the liquids and the voice or light signal is generated.

The anatomical kidney phantom described above is equally realistic so that it can be used for the training of minimally invasive therapy under the ultrasound and fluoroscopy/CT control. In addition it is evident to the person skilled in the art that furthermore alternative embodiments of the patient specific anatomical kidney phantom simulator according to the claim 1 within the scope of the present invention as defined in the appended claims are possible.

REFERENCES

1. T. Sabharwal, N. Fotiadis, and A. Adam, "Modern trends in interventional radiology," *British medical bulletin*, vol. 81-82, pp. 167-82, January 2007.

2. K. Bragg, N. VanBalen, and N. Cook, "Future trends in minimally invasive surgery," *AORN*, vol. 82, no. 6, 2005.

3. U. Guller, S. Hervey, H. Purves, L. H. Muhlbaier, E. D. Peterson, S. Eubanks, and R. Pietrobon, "Laparoscopic versus open appendectomy: outcomes comparison based on a large administrative database," *Annals of surgery*, vol. 239, no. 1, pp. 43-52, January 2004.

4. R. Horstmann, a Klotz, C. Classen, and D. Palmes, "Feasibility of surgical technique and evaluation of postoperative quality of life after laparoscopic treatment of intrathoracic stomach," *Langenbeck's archives of surgery/ Deutsche Gesellschaft für Chirurgie,* vol. 389, no. 1, pp. 23-31, February 2004.

5. R. M. Satava, "Historical review of surgical simulation—a personal perspective," *World journal of surgery,* vol. 32, no. 2, pp. 141-8, February 2008.

6. Hunt A, Ristolainen A, Ross P, Opik R, Krumme A, Kruusmaa M. Low cost anatomically realistic renal biopsy phantoms for interventional radiology trainees. Eur J Radiol. 2013 April; 82(4):594-600. doi: 10.1016/j.ejrad.2012. 12.020. Epub 2013 Feb. 8

7. B. G. Rock, a P. Leonard, and S. J. Freeman, "A training simulator for ultrasound-guided percutaneous nephrostomy insertion," *The British journal of radiology,* vol. 83, no. 991, pp. 612-4, July 2010.

8. W. L. Strohmaier and A. Giese, "Ex vivo training model for percutaneous renal surgery," *Urological research,* vol. 33, no. 3, pp. 191-3, June 2005.

9. "Ultrasound Percutaneous Nephrostomy Trainer." [Online]. Available: http://limbsandthings.com/uk/products/ultrasound-percutaneous-nephrostomy-trainer/. [Accessed: 16 Jan. 2013].

The invention claimed is:

1. A patient specific anatomical kidney phantom simulator, comprising:
   a housing filled with a surrounding material replicating soft tissue of a patient, and covered with a covering material having properties corresponding to properties of a patient skin;
   an anatomical kidney phantom placed into the surrounding material and having a multitude of cavities simulating parts of kidney calyces, each cavity simulating a kidney calyx, where the multitude of cavities are not connected to each other;
   wherein the anatomical kidney phantom simulator further comprises:
      a multitude of outer reservoirs, each outer reservoir of the multitude of reservoirs is filled with a corresponding liquid of a different color or a corresponding x-ray opaque contrast liquid, wherein the multitude of the outer reservoirs corresponds to the multitude of the cavities in the anatomical kidney phantom, and
      a multitude of channels in the surrounding material for introducing different colored liquids or x-ray opaque contrast liquids from the outer reservoirs into the cavities, wherein each channel is attached from one end to one reservoir of the multitude of reservoirs and from another end to a connecting pipe attached to a corresponding cavity of the multitude of cavities.

2. The anatomical kidney phantom simulator according to the claim 1 wherein the anatomical kidney phantom is an anatomically correct kidney design created based on series of computed tomography images by segmenting the computed tomography images and creating a 3D model.

3. The anatomical kidney phantom simulator according to the claim 1, wherein the cavities simulating kidney calyces are formed from air balloons with a diameter of 5 to 7 mm which are placed into a mold before casting the anatomical kidney phantom and removed after the casting.

4. The anatomical kidney phantom simulator according to claim 1, wherein the channels are pipes connecting cavities simulating kidney calyces with outer reservoirs.

5. The anatomical kidney phantom simulator according to claim 2, wherein the anatomic kidney phantom comprises anatomically shaped blood vessels simulating renal veins and renal arteries.

6. The phantom according to claim 5, wherein the anatomically shaped blood vessels are filled with a blood mimicking fluid.

7. The anatomical kidney phantom simulator according to claim 1, wherein the anatomical kidney phantom is for training of a minimally invasive therapy under ultrasound and fluoroscopy/CT control.

8. The anatomical kidney phantom simulator according to claim 1, wherein electrical contacts are submerged into the outer reservoirs and connected to a punctuation needle for instant identification of a needle entering into the cavity for controlling a work precision of interventional radiologists.

9. The anatomical kidney phantom simulator according to claim 5, wherein the renal veins and the renal arteries are reconstructed from the series of computed tomography images by segmenting the computed tomography images as the anatomical kidney phantom.

10. The anatomical kidney phantom simulator according to claim 1, wherein the anatomical kidney phantom comprises three to six outer reservoirs.

11. The anatomical kidney phantom simulator according to claim 1, further comprising:
   a base, wherein the anatomical kidney phantom is fixed to the base and the outer reservoirs are fixed on the base or on to the housing.

* * * * *